United States Patent [19]

Schneider

[11] Patent Number: 4,615,688
[45] Date of Patent: Oct. 7, 1986

[54] COUPLING DEVICE

[75] Inventor: Rudolf Schneider, Reinach, Switzerland

[73] Assignee: Erowa AG, Reinach, Switzerland

[21] Appl. No.: 543,030

[22] Filed: Oct. 18, 1983

[30] Foreign Application Priority Data

Oct. 18, 1982 [CH] Switzerland ............... 6055/82
Aug. 18, 1983 [CH] Switzerland ............... 4507/83

[51] Int. Cl.<sup>4</sup> .............................................. F16D 1/02
[52] U.S. Cl. ............................. 464/93; 464/137; 403/13; 403/337
[58] Field of Search .............. 403/13, 14, 335, 336, 403/337; 464/51, 77, 92, 93, 113, 137

[56] References Cited

U.S. PATENT DOCUMENTS

| | | | |
|---|---|---|---|
| 1,651,671 | 12/1927 | Carrey | 464/93 |
| 2,908,153 | 10/1959 | Kolls et al. | 464/93 |
| 3,408,831 | 11/1968 | Schoeben | 464/93 |
| 3,662,568 | 5/1972 | Kashima et al. | 464/93 |
| 3,728,871 | 4/1973 | Clijsen | 464/77 |
| 4,120,175 | 10/1978 | Dernedde | 464/93 |
| 4,253,776 | 3/1981 | Orain | 403/337 |

Primary Examiner—Willis R. Wolfe, Jr.
Attorney, Agent, or Firm—Yount & Tarolli

[57] ABSTRACT

The invention provides a coupling device with a first, driven member and a second member to be driven by the first member to a rotational movement. A driving plate is arranged between the two members and fixedly connected to the second member. In order to provide an angularly and centrically well defined position of the two members relative to each other, said first driven member is equipped with a centrically as well as an eccentrically arranged driving pin, the outer surfaces thereof having at least partially a conical shape. The conical parts of the surfaces engage with openings correspondingly arranged in the driving plate, which is elastically deformed upon connection of the second member to the first member.

14 Claims, 8 Drawing Figures

COUPLING DEVICE

BACKGROUND OF THE INVENTION

The present invention relates to a coupling device adapted to connect a first rotatable part to a second part to be driven to a rotational movement, particularly a coupling device suitable to temporarily connect a workpiece to a machining apparatus in an angularly and centrically well defined relationship.

Upon fixing a workpiece on a machining apparatus (e.g. a turning lathe, a milling machine, a grinding machine or the like) it is of paramount importance that the workpiece to be treated in such a machine be connected thereto in a very precise manner with reference to the rotational axis of the machine. In the case of a turning lathe this is the rotational axis of the chuck, whereby the angular position of the workpiece relative to said axis is of no further importance. However the centricity of the workpiece relative to said axis must be observed with a high degree of precision. In the case of a milling or grinding apparatus not only the centricity is important, but also the angular position of the workpiece with reference to the axis of rotation of the machining apparatus must be observed.

During the construction of precision tools extremely high requirements must be observed with reference to the machining of a workpiece. Particularly it must be ensured that a workpiece to be machined is connected to a machining apparatus in an exactly defined position.

It is well known to use conically shaped receiving members to connect a workpiece to a machining apparatus, whereby tight tolerances may be achieved in view of eccentricity. However this conically shaped receiving members are subjected to contamination by environal influences and by chips which are generated during the operation of the machining apparatus. A contaminated conically shaped receiving member either is degraded in its precision or cannot be loosened any longer due to occuring of self-locking. In addition it is not possible to connect a workpiece by means of such conically shaped receiving members in an exactly defined angular position.

The same facts are true regarding the known and widely used chucks. They are also subjected to contamination during the machining process and do not offer any solution for receiving a workpiece in an angularly well defined position.

If a workpiece has to be machined to an extremely high degree of precision, the connecting members receiving the workpiece and fixing it to the machining apparatus must be manufactured with at least the same high degree of precision. This is true for conically shaped receiving members as well as for chucks, e.g. of a turning lathe. Of course such high precision involves well qualified workmanship and very high costs, which is especially disadvantageous if a relatively high number of such fixing members is required.

A still further problem not sufficiently solved until now may be seen in the fact that a workpiece may have to be fixed to a plurality of different machining apparatuses in order to perform a plurality of machining steps on the same workpiece. Thereby it is ensured that the workpiece always must be connected to the corresponding machining apparatus in an angularly and centrically well defined position with very high precision. For example, in forming an electrode tool of an electroerosive machining apparatus a plurality of machining operations is required which have to be performed on different machining apparatuses. The machining of these workpieces must be performed within a tolerance of plus or minus one thousandth of a millimeter whereby it would be most desireable to displace the workpieces from one machining station to the following one quickly and to fix the workpieces in an angularly and centrically well defined manner with very high precision.

OBJECTS OF THE INVENTION

It is an object of the present invention to provide a coupling device particularly for connecting a workpiece to a machining apparatus which avoids the disadvantages mentioned hereinbefore and which especially allows to connect a workpiece to a machining apparatus in an angularly and centrically well defined position with reference to the axis of rotation of the machining apparatus.

A further object of the invention is to provide a coupling device for connecting a workpiece to a machining apparatus which allows a quick release of the workpiece from a first machining apparatus and a quick connection of said workpiece to a succeeding machining apparatus.

A still further object of the invention is to provide a coupling device which is substantially insensitive to contamination to which it is subjected during machining of the workpiece.

SUMMARY OF THE INVENTION

The invention provides a coupling device adapted to connect a first rotatable part to a second part to be driven to a rotational movement, particularly to connect a workpiece to be machined with high precision to a machining apparatus. The coupling device comprises a first member and a second member, these two members being coaxially arranged with reference to a common axis of rotation. Between these two members there is provided a driving plate. The first member is equipped with at least two driving pins protruding from one face thereof towards said driving plate. The driving plate is fixedly connected to the second member, i.e. the one without the driving pins, in a certain distance to the face thereof which is directed towards said second member.

The plate member is equipped with a plurality of openings which are correspondingly arranged with reference to the driving members provided on said first member. The outer sufaces of the driving pins have at least partially a conical shape, whereby the edges of the openings in the driving plate at least partially engage this conical outer surface regions of the driving pins, when the coupling device is assembled, i.e. the first member is connected to the second member with the driving plate therebetween.

Basically it will be sufficient to provide a first centrically mounted driving pin and a second eccentrically mounted driving pin on said first member to ensure an angularly and centrically well defined position of the second member with reference to the first member. However it may be advantageous to provide four eccentrically mounted driving pins without any centrically mounted driving pin. This ensures a well defined position of the two members relative to each other as well.

A plurality of preferred embodiments may be realized within the scope of the present invention. An especially preferred embodiment will be described in more detail hereinbelow.

BRIEF DESCRIPTION OF THE DRAWINGS

In the following there will be described a preferred embodiment of the invention, with reference to the accompanying drawings, in which.

DESCRIPTION OF A PREFERRED EMBODIMENT

Figure 1:
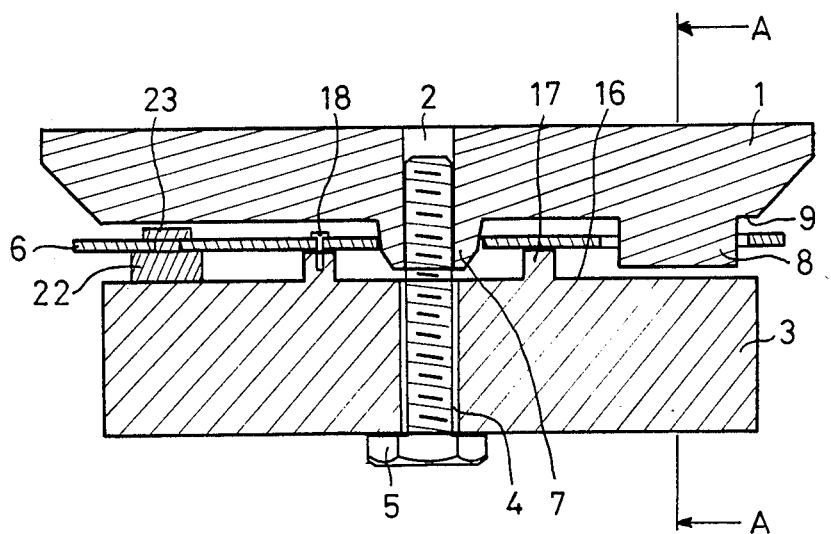
FIG. 1 shows an axial sectional view of the first member and the second member, the members being released one from each other.

According to the sectional view shown in FIG. 1 there is provided a first member 1 having generally disc-shaped form and being provided with a central threaded bore 2. The second member is designated by reference numeral 3. It also has substantially disc-shaped form and is provided with a central bore 4. The two members are arranged concentrically to each other, with reference to a central axis X through the bores 2 and 4. A screw 5 penetrates the bore 4 and is connected to the first member 1 by engaging its threaded bore 2. By fastening the screw 5 the two members 1 and 3 are displaced against each other in axial direction. However as shown in FIG. 1 the screw 5 is not fastened and the two members 1 and 3 lay only loosely on each other.

A driving plate 6 is arranged between the members 1 and 3, fixedly connected to the second member 3. Preferably the first member 1 is connected to a machining apparatus by suitable connecting means (not shown), e.g. to the spindle of a turning lathe, of a grinding apparatus or the like. The second member 3 supports a workpiece to be machined by means of suitable connecting members, which are known per se and therefore are not shown in the drawing. Consequently the coupling device shown in FIG. 1, the screw 5 being tightly fastened, provides a connection between a machining apparatus and a workpiece to be machined, the first member 1 thereby serving as a driving member, while the second member 3 will have the function of the driven member.

Figure 6:
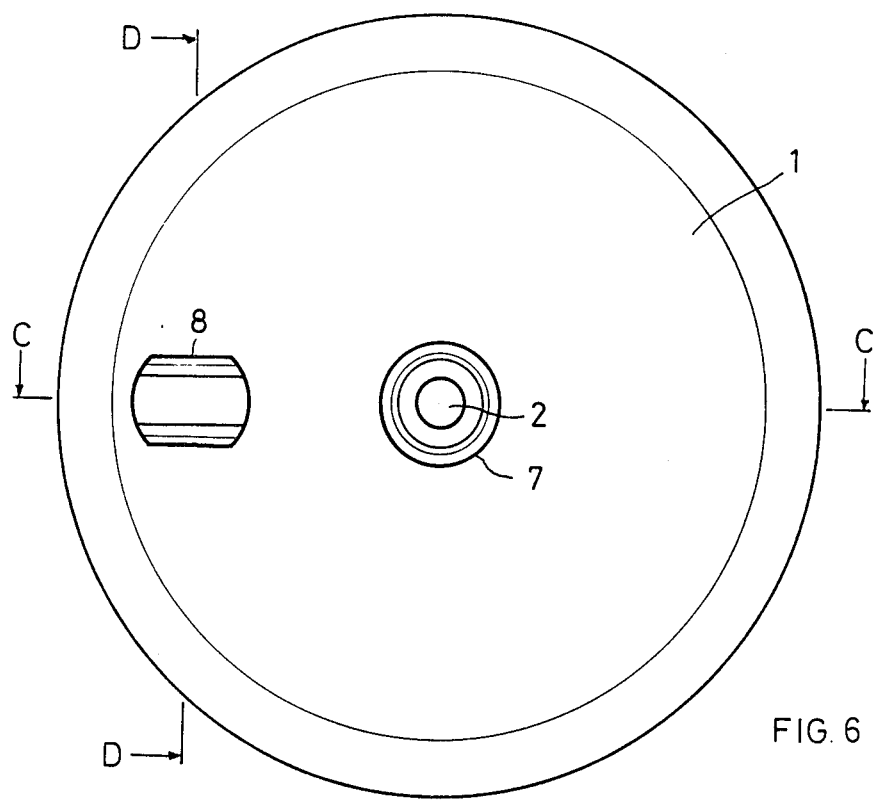
FIG. 6 shows a plain view of the second member.
Figure 7:
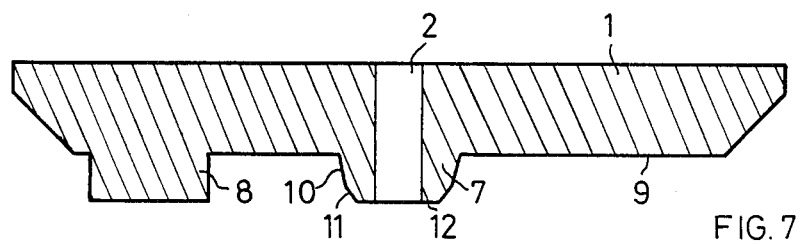
FIG. 7 shows a sectional view along the line C—C in FIG. 6.
Figure 8:
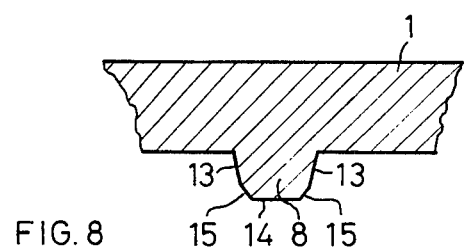
FIG. 8 shows a partial sectional view along the line D—D in FIG. 6.

It can further be seen from FIG. 1 and especially from FIG. 6-8 that the first member 1 is provided, on the one hand, with a centrally arranged driving pin 7 and, on the other hand, with an eccentrically arranged driving pin 8. Both pins, i.e. pin 7 and pin 8 protrude from surface 9 of the first member 1 towards the driving plate 6. The outer surface of the centrically arranged driving pin 7 is conically shaped including two regions, namely a first region 10 having the shape of a first nappe of a truncated cone adjacent to the base of the pin near the surface of the first member 1 and a second region 11 having the shape of a second nappe of truncated cone adjacent to the frontal end face of the pin 7. As seen in the sectional view according to FIG. 7 the inclination of the first region 10 is less than the inclination of the second region 11. With other words the region 11 adjacent to the end frontal face 12 of the pin 7 has a greater conicity than the following region 11 near the surface 9 of the first member 1. The reason for this difference will be explained hereinafter.

The driving pin 8 arranged on the first member 1 eccentrially with reference to the axis of rotation X comprises two side faces 13 arranged parallel to the radius of the first member 1 and being inclined relative to the axis of rotation X of the first member 1. Within the region of the end frontal face 14 of the driving pin 8 these inclined surfaces 13 merge into two further surfaces 15 also included with reference to the axis of rotation X but to a further degree and being disposed parallel to the radius of the first member 1 as well.

The second member 3 is equiped with a ring-shaped bead 17 arranged concentrially with reference to the bore 4 and protruding from the surface 16 of the second member 3. The driving plate 6 rests on the end frontal face of said bead 17 and is fixedly connected therewith by means of screws 18. It can be seen from FIG. 1 that the driving plate 6 thereby is held and connected to the second member 3 in spaced relationship.

Figure 5:
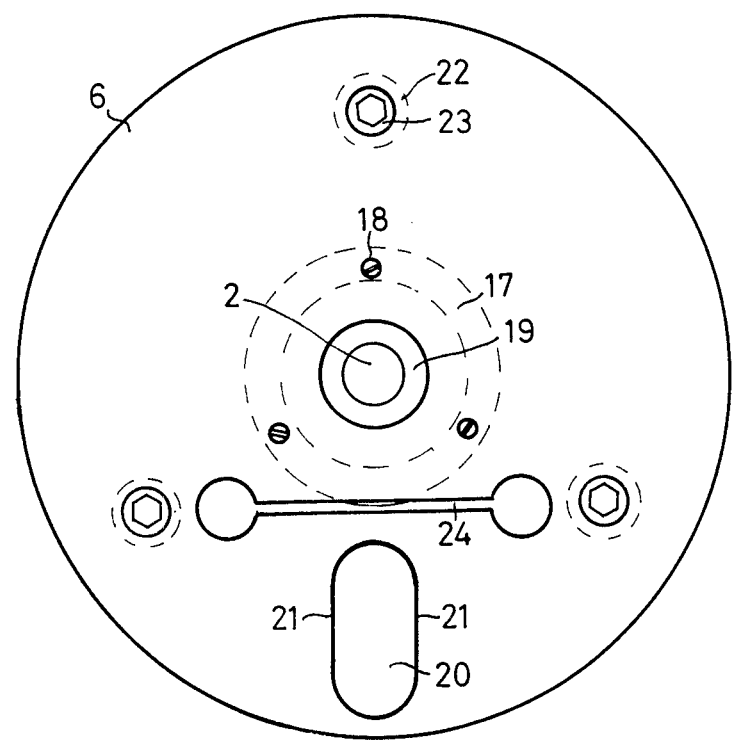
FIG. 5 shows a plain view of the first member having the plate member placed thereon.
Figure 3:
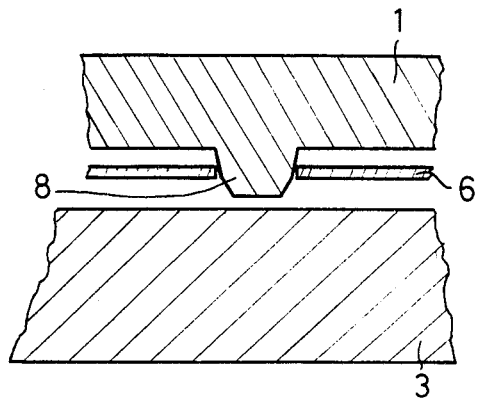
FIG. 3 shows a partial, sectional view along line A—A in FIG. 1.
Figure 4:
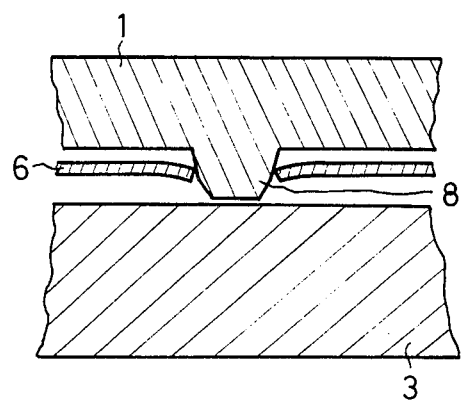
FIG. 4 shows a partial, sectional view along line B—B in FIG. 2.

It can be seen in FIG. 5 that the driving plate 6 is equipped with a central circular opening 19 as well as with an eccentrically arranged, substantially oval opening 20. The latter comprises to parallel side edges 21 extending parallely to the radius of the axis of rotation X of the coupling device. It can be seen especially from FIG. 1 that the central opening 19 has such a diameter that the edge thereof partially engages the region 10 of the member 1 which has the shape of a nappe of a truncated cone. The two parallel edges 21 of the opening 20, however, have such a distance between each other that they engage the inclined flat side surfaces 13 of the driving pin 8, as can be seen best from FIG. 3.

From the foregoing it can readily be understood that the cooperation of the driving pin 7 with the opening 19 provides a centering of the second member 3 with reference to the first member 1 while the cooperation of the driving pin 8 with the opening 20 ensures an angularly well and precisely defined position of the clutch member 1 with reference to the second member 3.

The second member 3 is provided with distance pins 22, the end frontal surface 23 thereof protruding form the surface 16 of the second member 3, the coupling device being engaged by tightening the screw 5, the end frontal surfaces 23 of the distance pins 22 abutting against the surface 9 of the first member 1. Thereby is ensured that the two members 1 and 3 are disposed in an exactly parallel relationship with reference to each other.

Figure 2:
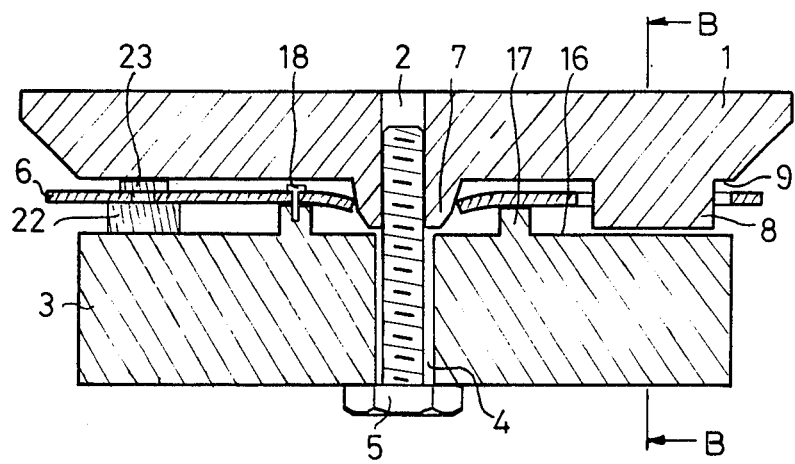
FIG. 2 shows an axial sectional view of the coupling device according to the invention, the two members being connected to each other.

FIG. 2 shows the coupling device in an engaged operational position. As previously stated it is desired to have the two members 1 and 3 positioned in three dimensions relative to each other. This is achieved as follows:

The distance between the two members 1 and 3 as well as their parallel relationship is attained by the provision of the distance pins 22, the end frontal faces 23 thereof abutting against the surface 9 of the first member 1.

The concentricity of the two members 1 and 3 is ensured by the cooperation of the driving pin 7 and the opening 19 of the driving plate 6. As already mentioned the edges of the opening 19 engage the conical surface 10 of the driving pin 7 only partially as long as the coupling device is only loosely engaged. Upon tightening the screw 5, whereby the coupling device is fully engaged as shown in FIG. 2, the edges of the opening 19 of the driving plate 6 fully engages the nappe face 10 thereby causing a deformation of the driving plate 6 in the region of the opening thereof. Simultaneously there is provided a cleaning effect of the outer surface of the driving pin 7.

The angular position of the second member 3 with reference to the first member 1 is ensured by the cooperation of the driving pin 8 and the opening 20 in as much as the side edges 21 of the opening 20 in the driving plate 6 engage the conical side surfaces 13 of the pin 8 protruding from the first member 1. As explained hereinbefore and shown in FIG. 2 the driving plate 6 will be deformed in the region of its opening 20, the edges 21 thereof being urged against the surfaces 13 and simultaneously cleaning them.

The side regions of the driving pins which are inclined to a further degree, i.e. the regions 11 of the central pin 7 as well as the regions 15 of the pin 8 facilitate the fitting and engaging of the second member 3, bearing the workpiece to be machined, with the first member 1. Basically these regions 11 and 15 do not have any effect on the proper function of the coupling device, except if the tolerances of the openings 19 and 20 are at the lowermost limit; thereby the edges of said openings engage the aforementioned inclined regions 11 and 15 of the two pins 7 and 8.

As can be seen from FIG. 5 the driving plate 6 is equipped with a slot 24 extending perpendicularly to a line between the central opening 19 and the eccentric opening 20. The provision of this slot 24 ensures that the central region of the driving plate 6, around the central opening 19, may be elastically deformed independently of any elastical deformation of the edge region around the opening 20. Thereby the two members 1 and 3 are positioned relative to each other with a very high degree of precision in angular as well as in central relationship.

One of the main advantages of the coupling device according to the present invention lies in the fact that only one ot the members, according to the embodiment hereinbefore described the first member 1 with the driving pins 7 and 8, has to be precisely machined. The other member, i.e. the second member 3 with the driving plate 6 attached thereto, may comprise relatively high machining tolerances without the danger that the precision of the relative position between first members 1 and 3 would be degraded. The only important point is that the central opening 19 is exactly circular and that the two side edges 21 of the eccentrically arranged opening 20 are exactly parallel to each other. In practise this goal may easily be realized, especially as the absolute value of the diameter of the central opening 19 as well as the absolute value of the distance between the two parallel side edges 21 of the opening 20 is of no further importance.

What I claim is:

1. A device adapted to connect a first rotatable part to a second part to be driven in a rotational movement, particularly to connect a workpiece to a machining apparatus, comprising:
   a first member and a second member, said first and second members being coaxially arranged with reference to each other;
   a driving plate member coaxially arranged between said first and second members;
   said first member comprising at least two driving pins protruding from one face thereof towards said driving plate member;
   said driving plate member being fixedly connected to said second member in a certain distance from the face thereof directed towards said driving plate member, and comprising a plurality of openings which are correspondingly arranged with reference to said driving pins on said first member;
   outer surfaces of at least one of said driving pins having at least partially conical shape, the edges of said openings in said driving plate at least partially engaging said outer surfaces of said driving pins on said first member when said first member is connected to said second member, the first of said driving pins being centrically mounted, and the second of said driving pins being eccentrically mounted, said second member comprising a circularly shaped concentrically arranged bead protruding from the frontal face thereof, said driving plate being fixed to the frontal face of said bead.

2. A device adapted to connect a first rotatable part to a second part to be driven in a rotational movement, particularly to connect a workpiece to a machining apparatus, comprising:
   a first member and a second member, said first and second members being coaxially arranged with reference to each other;
   a driving plate member coaxially arranged between said first and second members;
   said first member comprising at least two driving pins protruding from one face thereof towards said driving plate member;
   said driving plate member being fixedly connected to said second member in a certain distance from the face thereof directed towards said driving plate member, and comprising a plurality of openings which are correspondingly arranged with reference to said driving pins on said first member;
   outer surfaces of at least one of said driving pins having at least partially conical shape, the edges of said openings in said driving plate at least partially engaging said outer surfaces of said driving pins on said first member when said first member is conneceted to said second member, said driving plate comprising at least one slot situated between said openings, said openings including a centric opening and an eccentric opening, and said one slot being situated between said centric and eccentric openings and extending perpendicularly to an axis through said centric and eccentric openings.

3. A coupling device for transmitting a rotary torque from a first part to a second part, said coupling device comprising:
   coaxial first and second members connected, respectively, to said first and second parts for joint rotation therewith,
   a driving plate member coaxially arranged between said first and second members, said driving plate member being fixedly connected to one of said first and second members at a predetermined distance from the end face thereof facing said driving plate member;

the other of said first and second members comprising at least two driving pins projecting from the end face thereof facing said driving plate member, said driving plate member comprising opening means for engaging outer surfaces of said at least two driving pins;

said coupling device further comprising means for maintaining a predetermined distance between said end faces of said one and other members.

4. A coupling device according to claim 3 wherein said means for maintaining a predetermined distance betwen said end faces comprises a projection on one of said end faces for abutting another of said end face.

5. A device adapted to connect a first rotatable part to a second part to be driven in a rotational movement, particularly to connect a workpiece to a machining apparatus, comprising:

a first member and a second member, said first and second members being coaxially arranged with reference to each other;

a driving plate member coaxially arranged between said first and second members;

said first member comprising at least two driving pins protruding from one face thereof towards said driving plate member;

said driving plate member being fixedly connected to said second member at a certain distance from the face thereof directed towards said driving plate member, and comprising a plurality of openings which are correspondingly arranged with reference to said driving pins on said first member;

outer surfaces of at least one of said driving pins having at least partially conical shape, the edges of said openings in said driving plate at least partially engaging said outer surfaces of said driving pins on said first member when said first member is connected to said second member, the first of said two driving pins being centrically mounted and the second of said two driving pins being eccentrically mounted, said eccentrically mounted driving pin comprising two surface regions arranged on opposite sides thereof parallel to a radius of said device and inclined with reference to the central axis of said device, each of said two surface regions is composed of two surfaces which are inclined with reference to the central axis of said device at different angles.

6. A device according to claim 5, wherein a first surface adjacent to an end face of said second eccentrically mounted driving pin is more inclined with reference to the central axis of said device than a second surface adjacent to a surface of said first member.

7. A device adapted to connect a first rotatable part to a second part to be driven in a rotational movement, particularly to connect a workpiece to a machining apparatus, comprising:

a first member and a second member, said first and second members being coaxially arranged with reference to each other;

a driving plate member coaxially arranged between said first and second members;

said first member comprising at least two driving pins protruding from one face thereof towards said driving plate protruding from one face towards said driving plate member;

said driving plate member being fixedly connected to said second member at a certain distance from the face thereof directed towards said driving plate member, and comprising a plurality of openings which are correspondingly arranged with reference to said driving pins on said first member;

outer surfaces of at least one of said driving pins having at least partially conical shape, the edges of said openings in said driving plate at least partially engaging said outer surfaces of said driving pins on said first member when said first member is connected to said second member, the first of said driving pins being centrically mounted driving pin and the second of said driving pins being eccentrically mounted, said driving plate comprising a first centrically arranged opening having circular shape and a second eccentrically arranged opening for mounting said driving plate on said two driving pins, said eccentrically arranged opening having two opposite edges extending parallel to the radius of said driving plate, the distance between said two parallel edges of said eccentric opening being smaller than the width of said eccentrically arranged driving pin at its base, but bigger than the width thereof at its top, both widths being measured in a direction perpendicular to the radius of the device.

8. A device according to claim 7, wherein said distance is in the region between the width of said eccentrically arranged driving pin at its base and the width thereof at its border between the two differently inclined surfaces.

9. A device adapted to connect a first rotatable part to a second part to be driven in a rotational movement, particularly to connect a workpiece to a machining apparatus, comprising:

a first member and a second member, said first and second members being coaxially arranged with reference to each other;

a driving plate member coaxially arranged between said first and second members;

said first member comprising at least two driving pins protruding from one face thereof towards said driving plate member;

said driving plate member being fixedly connected to said second member at a certain distance from the face thereof directed towards said driving plate member and comprising a plurality of openings which are correspondingly arranged with reference to said driving pins on said first member;

outer surfaces of at least one of said driving pins having at least partially conical shape, the edges of said openings in said driving plate at least partially engaging said outer surfaces of said driving pins on said first member when said first member is connected to said second member, the first of said two driving pins being centrically mounted and the second of said two driving pins being eccentrically mounted;

an outer surface of said first centrically mounted driving pin at least partially having the shape of a nappe of a truncated cone, and said outer surface of said first centrically mounted driving pin comprising a first basic region having the shape of a first nappe of a truncated cone and a second region adjacent to the top face of said driving pin and having the shape of a second nappe of a truncated cone.

10. A device according to claim 9, wherein the angle of the related cone is smaller at said first region than the angle of the related cone at said second region.

11. A device accordimg to claim 10, wherein one of said plurality of openings is circular and the diameter of said circular opening is smaller than the diameter at the base of said centrically arranged first driving pin but bigger than the diameter of the top frontal face of said first driving pin.

12. A device according to claim 11, wherein the diameter of said circular opening corresponds to a mean value between the maximal and the minimal diameter of the truncated cone shaped nappe region of said centrically arranged first driving pin.

13. A device according to claims 9, 5 or 7, wherein said driving plate is made of elastically deformable material.

14. A device according to claim 13, wherein said driving plate is made of elastically deformable spring steel.

* * * * *